United States Patent [19]
Pages

[11] 3,820,661
[45] June 28, 1974

[54] APPARATUS FOR THE TREATMENT OF A LIQUID PARTICULARLY BY REVERSE OSMOSIS

[75] Inventor: Michel Pages, Ardeche, France

[73] Assignee: Societe Des Usines Chimiques Rhone-Poulenc, Paris, France

[22] Filed: Apr. 23, 1971

[21] Appl. No.: 136,859

[30] Foreign Application Priority Data
Apr. 24, 1970 France .............................. 70.15146

[52] U.S. Cl. ................................ 210/321, 210/433
[51] Int. Cl. ............................................ B01d 31/00
[58] Field of Search ............ 210/23, 321, 323, 433, 210/490, 491

[56] References Cited
UNITED STATES PATENTS

| | | | |
|---|---|---|---|
| 3,442,389 | 5/1969 | Mendelson | 210/321 |
| 3,457,170 | 7/1969 | Havens | 210/321 X |
| 3,542,204 | 11/1970 | Clark | 210/321 |
| 3,716,143 | 2/1973 | Clark | 310/433 X |

*Primary Examiner*—Frank A. Spear, Jr.
*Attorney, Agent, or Firm*—Stevens, Davis, Miller & Mosher

[57] ABSTRACT

Apparatus particularly useful in reverse osmosis, dialysis or ultrafiltration, having a plurality of porous tubular supports coated with a semi-permeable membrane fitted in a casing consisting of an annular sleeve with a guide plate at each end. A fluid to be treated is communicated to the exterior of the porous tubular supports, while product fluid is obtained from the interior of the porous tubular supports. The guide plates slidably mount in holes therethrough the ends of the porous tubular supports while the ends of the casing are closed by end plates clamping the guide plates in position relative to the casing.

4 Claims, 3 Drawing Figures

APPARATUS FOR THE TREATMENT OF A LIQUID PARTICULARLY BY REVERSE OSMOSIS

The present invention concerns an apparatus for treating a liquid with a view to extracting one of the constituents of the liquid by a process using semipermeable membranes, utilisable more particularly for reverse osmosis.

Reverse osmosis is used particularly for producing fresh water from sea water. The apparatus can also be used for the treatment of any other liquid whether, for example, this is for concentrating a solution or for the extraction of a purified solvent.

Apparatus is already known, particularly for the desalination of sea water by reverse osmosis, which comprises a plurality of elements formed of tubular porous supports, coated externally with a semipermeable membrane and arranged in a bundle in the interior of a fluid-tight casing for the circulation of the liquid being treated, and means for the extraction of a diffused flow which has passed through the membranes and is collected at the ends of the said supports.

It is particularly desirable to provide apparatus which can be easily dismantled, and which can be used to treat liquids at high pressures with good circulation of the liquid along the membranes. Such qualities are particularly appreciable in the operation of reverse osmosis and ultrafiltration processes.

According to the present invention there is provided apparatus for treatment of a fluid utilizing a semipermeable membrane comprising a plurality of porous tubular supports mounted within a casing by a pair of guide plates, each support being coated externally with a semipermeable membrane and having its opposite ends slidably received in holes through the respective guide plates, means for admitting fluid to be treated to the interior of the casing about the exterior of the tubular support between the guide plates, and means for receiving fluid from the interior of the tubular supports exteriorly of the guide plates. Advantageously, each guide plate comprises a supporting face for a seal establishing fluid-tightness around the said supports and in the interior of the casing under the pressure of the fluid to be treated.

Preferably, it comprises around each of the elements a sheath imposing on the liquid to be treated a longitudinal circulation in contact with membranes.

Advantageously, the said sheaths may have a polygonal section with faces in juxtaposition with those of the adjacent sheaths and a substantially fluid-tight connection with the corresponding support at each end. Each of these sheaths comprises at least two ports respectively in the vicinity of each end, the ports of adjacent sheaths facing each other so as to ensure a circulation in series of the treated liquid in the said sheaths, alternately in opposite directions lengthening of the exterior of the supports.

In order that the invention may be more clearly understood, the following description is given, merely by way of example, reference being made to the accompanying drawings in which.

Figure 1:
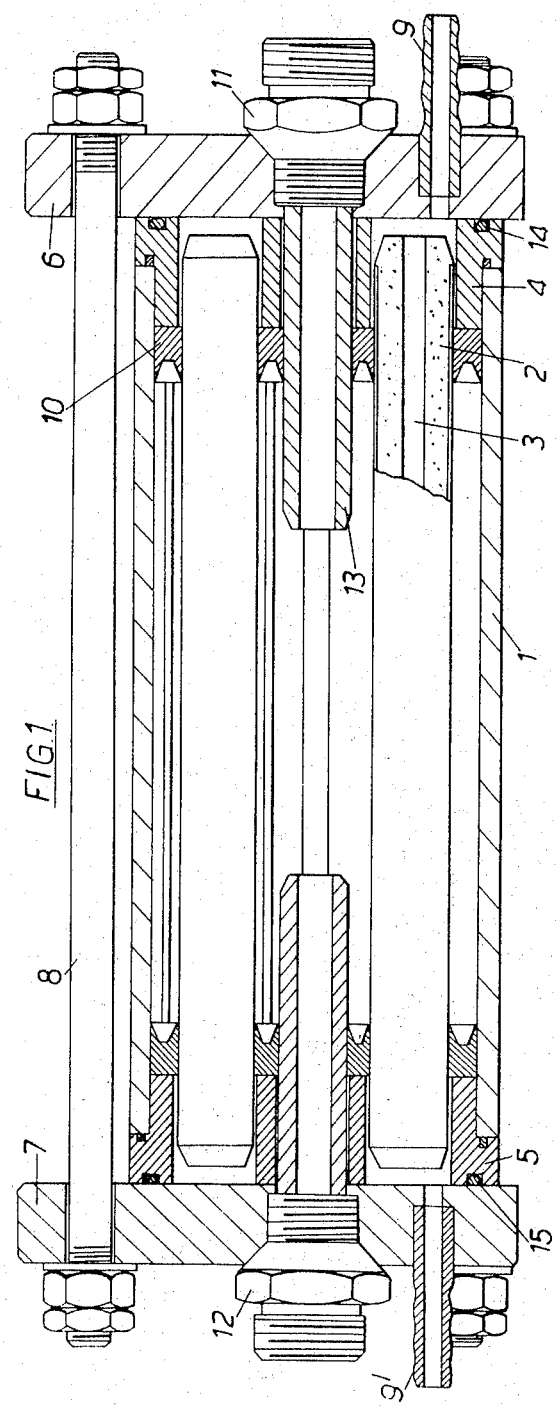
FIG. 1 is a scrap section of one embodiment of apparatus according to the invention.

The apparatus is described in the version intended for the treatment of a solution, the solvent of which is to be extracted by reverse osmosis. It is applied, in particular, for the production of potable water by desalination of sea water. In enables the treated liquid, such as sea water, to be circulated under high pressure in contact with semipermeable membranes, and a diffused flow to be extracted through the said membranes at a lower pressure, for example at atmospheric pressure. In the scope of the application more particularly considered, the membranes are chosen such that they are selectively permeable to water in the presence of salts dissolved in the sea water. Membranes on a cellulose acetate base are used, for example.

The apparatus is essentially composed of a number of cylindrical elements, arranged with their axes parallel to each other, and inside a casing for the confinement of the circulation of the treated liquid, the said casing being in part a cylindrical annular sleeve 1 surrounding the elements. In the particular case of FIG. 1, there are only six elements, equally spaced and arranged at equal distances from the axis of the casing.

The elements used are in themselves known. They have been described previously in French patent specification No. 1,585,386. Each element is formed essentially of a cylindrical tubular support 2, coated externally by a semipermeable membrane, at least in the zone which in operation is in contact with the liquid to be treated. This support ensures resistance to the pressure of the liquid outside the tubular supports. It is porous to permit the passage of the diffused flow to a central duct 3 open at both ends of the support. The semipermeable membrane is not shown in the figure.

The different elements are held at their two ends by guide plates 4 and 5, respectively, comprising regularly distributed orifices, in which the ends of the elements are engaged. Sufficient clearance, however, is provided to permit sliding of the elements in the guide plates.

The guide plates 4 and 5 are held respectively between the edges of the sleeve 1 and the end-plates 6 and 7, clamped against each other by tie-rods 8 external of the sleeve 1. The guide plates comprise recesses for accommodating ring seals 14 and 15 ensuring fluid-tightness of the low-pressure side, that is to say, between the sleeve 1 and the end plates 6 and 7. In the outer faces of the guide plates, in contact with the end plates, channels are provided for the intercommunication of the various orifices, thus permitting discharge of the diffused flow leaving the ends of the elements to an outlet connecting piece 9 (or 9').

Bearing on the inner face of each guide plate is a lipped seal 10, which when at rest, and in operation under the effect of the high pressure of the treated liquid, provides fluid-tightness around each of the elements 2 and against the sleeve 1. Due to the arrangement adopted, the mechanical stress set up by the pressure of the treated liquid is, in fact, transmitted to the end plates 6 and 7 and to the external tie rods 8.

Two connections 11 and 12 are screwed respectively in the plates 6 and 7 for the supply of the liquid to be treated and for the discharge of the treated liquid. They are each extended by a tube 13 entering in the axis of the bundle through the corresponding guide plate and the high-pressure sealing joint, the latter ensuring the same fluid-tightness around the tube as around each of the elements 2.

Figure 2:
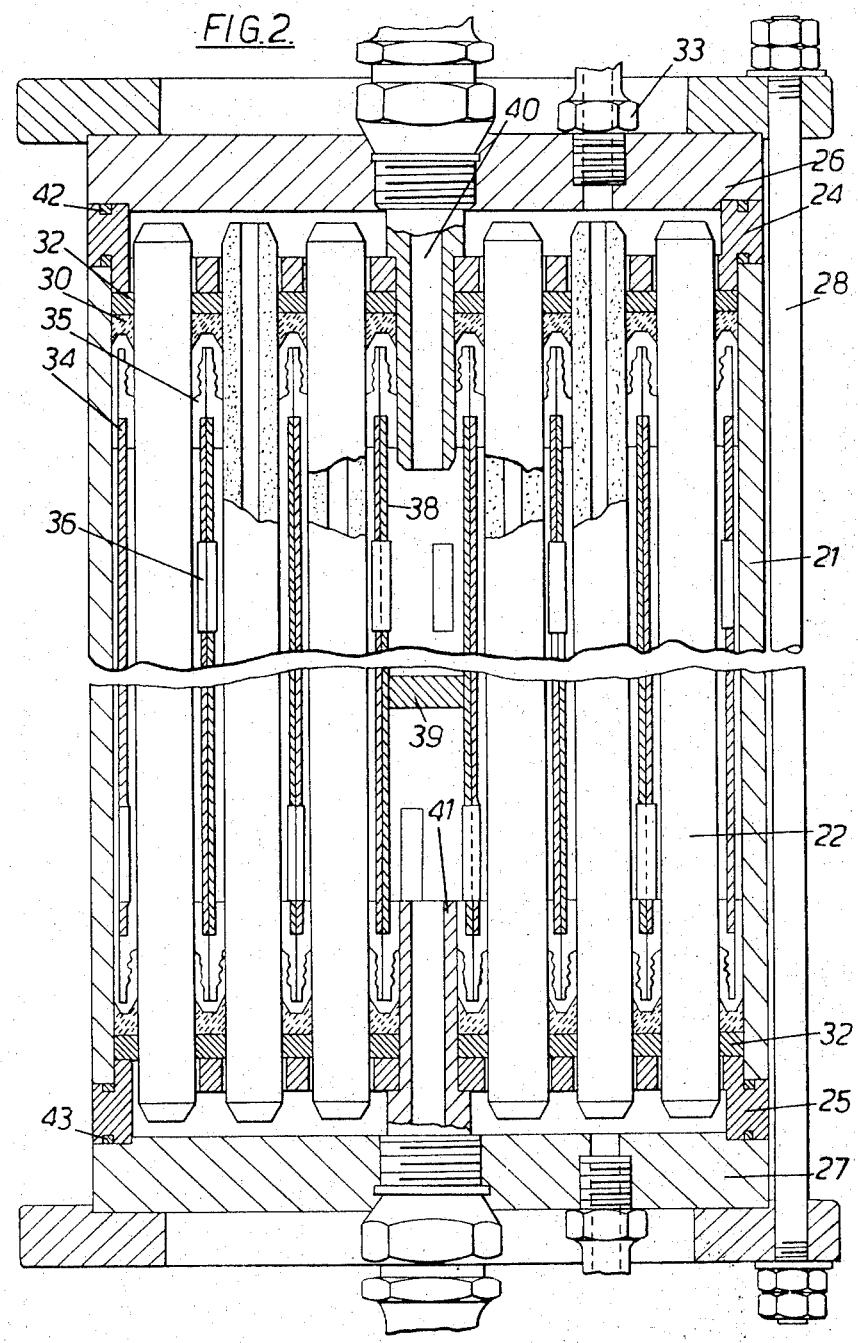
FIG. 2 is a scrap section of a preferred embodiment.
Figure 3:
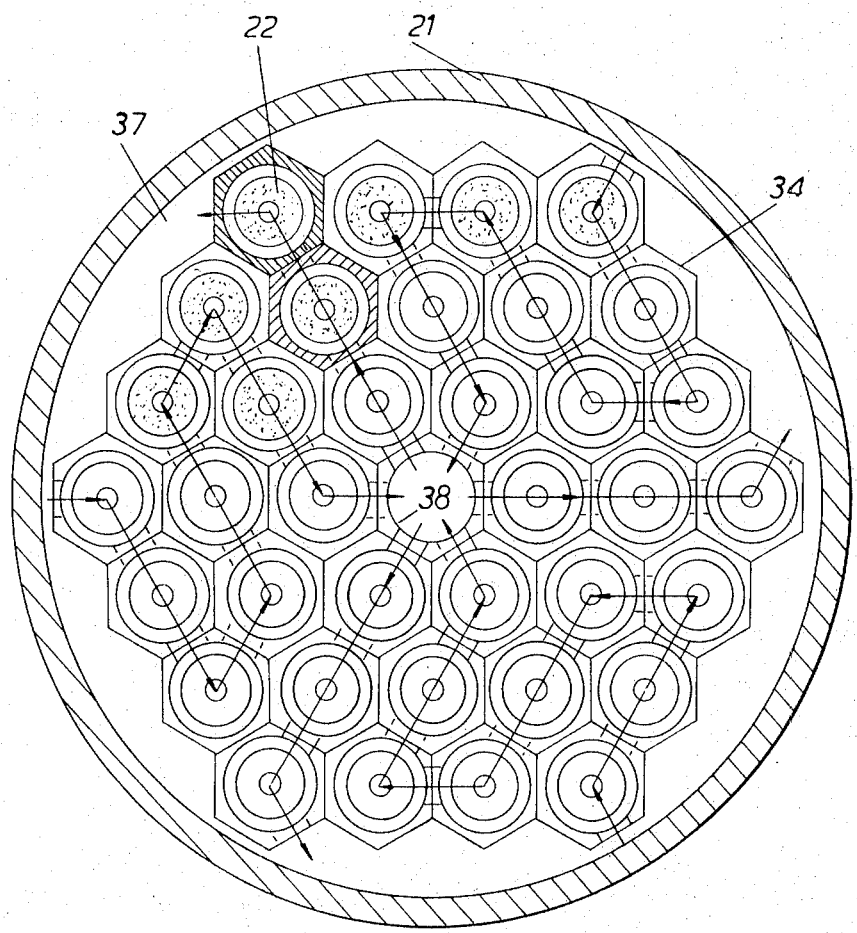
FIG. 3 is a cross-section of the apparatus of FIG. 2 diagrammatically representing fluid flow.

In the embodiment modification of FIGS. 2 and 3, there are the same essential components as in the embodiment described above, and in particular elements 22, sleeve 21, guide plates 24–25, end plates 26–27, seals 42–43 and seal 30 having the same respective functions as their counterparts in FIG. 1.

The seal 30, mounted on a supporting plate 32, ensures fluid-tightness at the pressure of the treated liquid with the sleeve 21 and the ends of the elements 22, while the mechanical stresses are transmitted by the guide plates 24–25 to plates 26–27 and tie-rods 28. The same guide plates also ensure drainage of the diffused flow leaving the ends of the different elements to a common outlet connection 33, into a drainage space between the guide plate and corresponding end plate.

In contrast, the apparatus according to the embodiment illustrated by FIGS. 2 and 3 comprises a large number of elements 22 forming a bundle of hexagonal cells. It does however, in contrast with the embodiment of FIG. 1, have individual sheaths around each of the elements for controlling the circulation of the liquid to be treated.

This arrangement is particularly advantageous when boundary layer effects are to be avoided, for example if the liquid to be treated is relatively viscous or contains solid matter in suspension which settles if the rates of circulation are insufficient.

Each sheath 34 has a polygenal cross-section adapted to the type of bundle selected. In the case described, this cross-section is hexagonal and the different faces of the sheath are in juxtaposition with the faces of the surrounding sheaths. At each end of the sheath, fluid-tightness with the corresponding element is ensured by a seal 35. The sheaths and the seals, however, do not have to resist a high pressure, because they are subjected to an isostatic pressure (that of the liquid to be treated).

These sheaths make it possible to impose on the fluid to be treated a longitudinal circulation in contact with the membranes of each element. Furthermore, they are designed to permit the organisation of a series circulation of a number of elements.

For this purpose, each sheath comprises two ports 36, respectively in the vicinity of each end and on two different faces of the sheath. The ports of adjacent sheaths face one another, thus ensuring series circulation of the treated liquid in successive sheaths, alternately in opposite directions longitudinally of the elements.

In the particular embodiment described and as illustrated by FIG. 3, the elements are divided into three groups such that the grouping arrangement has a threefold rotational symmetry. Circulation of the liquid is ensured in series in all the sheaths of the same group. For one of the intermediate communications between two successive sheaths in each group, the liquid passes through the annular space 37 left between the peripheral sheaths and the sleeve 21, into which space the ports of six peripheral sheaths open.

Entry and exit of the treated liquid into and from the system of sheaths occurs through the two ends of a supplementary sheath 38 occupying the middle of the bundle, but not provided with an element therein. This supplementary sheath comprises a fluid-tight transverse partition 39 dividing it into two chambers, one for the entry and the other for the exit of the liquid, and in the vicinity of each end, that is to say in each of these chambers, there are provided three ports communicating with adjacent sheaths, corresponding respectively to each of the above-mentioned groups of elements. In FIG. 3, arrows indicate the passage of the supply liquid.

The entry and exit of liquid through the guide plates 24 and 25 and seal 30 are effected, as in the first embodiment described, through tubes 40 and 41 for which in addition fluid-tightness with the sheath 38 is established by means of a seal identical with those provided between the elements and their respective sheaths.

The apparatus particularly described is adapted for reverse osmosis. It is quite clear that the same type of apparatus may be used for dialysis or ultrafiltration; it is merely necessary to employ appropriate membranes and to operate with the usual pressure conditions.

In the case of ultrafiltration, filling of the zone allocated to the liquid to be treated is obviously no longer necessary.

I claim:

1. Apparatus for treatment of a fluid by use of a semipermeable membrane and comprising in combination:
   a. a casing;
   b. a plurality of porous tubular supports;
   c. a semipermeable membrane around each of said porous tubular supports;
   d. means for providing a flow of fluid to the exterior of said porous tubular supports;
   e. means for receiving a flow of fluid from the interior of said porous tubular supports;
   f. two guide plates mounted to the casing and each provided with a plurality of holes therethrough, the porous tubular supports being slidably received in said holes for mounting within the casing; and
   g. a prismatic sheath of polygonal cross-section surrounding each porous tubular support, the sheath around each tubular support being in face contact with sheaths around adjacent supports.

2. Apparatus according to claim 1, wherein each sheath is sealed to the corresponding tubular support at each end and has a port at each end, at least one of which ports being in communication with a port of an adjacent sheath whereby fluid flow flows alternately in opposite directions lengthwise of the exterior of the supports.

3. Apparatus according to claim 2, which comprises a supplementary sheath which does not have a tubular support associated therewith but has an inlet portion at one end thereof, an outlet portion at the other end thereof, and a partition separating the inlet and outlet portions, the inlet portion communicating to the means for providing a flow of liquid to the exterior of said porous tubular supports and with at least one adjacent sheath, and the outlet portion communicating to the exterior of the apparatus and to at least one other adjacent sheath.

4. Apparatus according to claim 1, wherein an annular space is defined between the sheaths and the casing.

* * * * *